United States Patent
Anselmino

[11] 3,772,550
[45] Nov. 13, 1973

[54] WHEEL SPEED SENSOR FOR A BRAKING SYSTEM

[75] Inventor: Giovanni Anselmino, Turin, Italy

[73] Assignee: Fiat Societa per Azioni, Turin, Italy

[22] Filed: June 21, 1972

[21] Appl. No.: 265,039

[30] Foreign Application Priority Data
June 30, 1971 Italy .............................. 69221 A/71
Dec. 14, 1971 Italy .............................. 71084 A/71

[52] U.S. Cl. ............................................. 310/168
[51] Int. Cl. ........................................... H02k 19/20
[58] Field of Search .................... 310/168, 169, 170, 310/70, 75, 155; 74/711

[56] References Cited
UNITED STATES PATENTS

| | | | |
|---|---|---|---|
| 3,626,226 | 12/1971 | Pauwels | 310/168 |
| 3,683,219 | 8/1972 | Kruse | 310/168 |
| 3,626,227 | 12/1971 | Ritesma | 310/168 |
| 3,626,228 | 12/1971 | Jordan | 310/168 |
| 3,604,966 | 9/1971 | Liggett | 310/168 |
| 3,473,120 | 10/1962 | Ruof | 310/155 |
| 3,566,169 | 2/1971 | Fluder | 310/155 |

Primary Examiner—R. Skudy
Attorney—Richard C. Sughrue et al.

[57] ABSTRACT

A speed or position detector for a vehicle wheel, for use with anti-skid braking systems, has a mounting which according to this invention consists of a cylindrical appendage at the outer end of a stub axle on which the wheel is supported, a toothed phonic wheel being rotatably mounted on the appendage by a low-roller friction bearing, for example a roller bearing or a bearing of self-lubricating synthetic material. The phonic wheel cooperates with a magnetic pick-up the cable of which passes through a longitudinal passage in the stub axle.

4 Claims, 3 Drawing Figures

Fig_1

WHEEL SPEED SENSOR FOR A BRAKING SYSTEM

This invention relates to a system for mounting rotational speed or angular position detectors on a vehicle wheel, particularly for vehicle anti-skid braking systems. More particularly, the system is intended for the mounting of such detectors on a steerable wheel of a vehicle.

BACKGROUND OF THE INVENTION

Mounting systems are already known in which a single mounting serves to support a speed detector comprising a fixed magnetic pick-up cooperating with a phonic wheel or toothed wheel rotating with the vehicle wheel in such a way as to avoid misalignment due to wear of the support bearings of the vehicle wheel hub upon its stub axle. The special arrangement of such known mounting systems gives easy access to the speed detector from the outside, without the need to dismantle the vehicle wheel hub, or the wheel itself, by simply removing an outer cover.

An object of the present invention is to provide a single mounting system for a vehicle wheel speed or angular position detector of radically simplified structure and which is more economical in construction, requiring less assembly time and less maintenance, than earlier known mounting systems of the same type.

These advantages are achieved, among others, thanks to a particularly favourable selection of materials used for the various components of the detector.

SUMMARY OF THE INVENTION

According to the invention there is provided a mounting system for an angular speed or position detector for a vehicle wheel mounted on a stub axle, particularly for anti-skid braking systems, comprising a mounting fixed to the outer end of the stub axle and supporting a magnetic pick-up fixed to the mounting and a phonic wheel rotatable relative to the mounting, the phonic wheel having magnetic teeth co-operating with the pick-up and adapted to be rotated by the vehicle wheel, characterised in that the mounting has a cylindrical appendage on which the phonic wheel is rotatably supported by means of a low-friction bearing.

BRIEF DESCRIPTION OF THE DRAWINGS

The invention will be further described by way of non-limiting example, with reference to the accompanying drawings in which.

DETAILED DESCRIPTION OF THE ILLUSTRATED EMBODIMENTS

Figure 1:
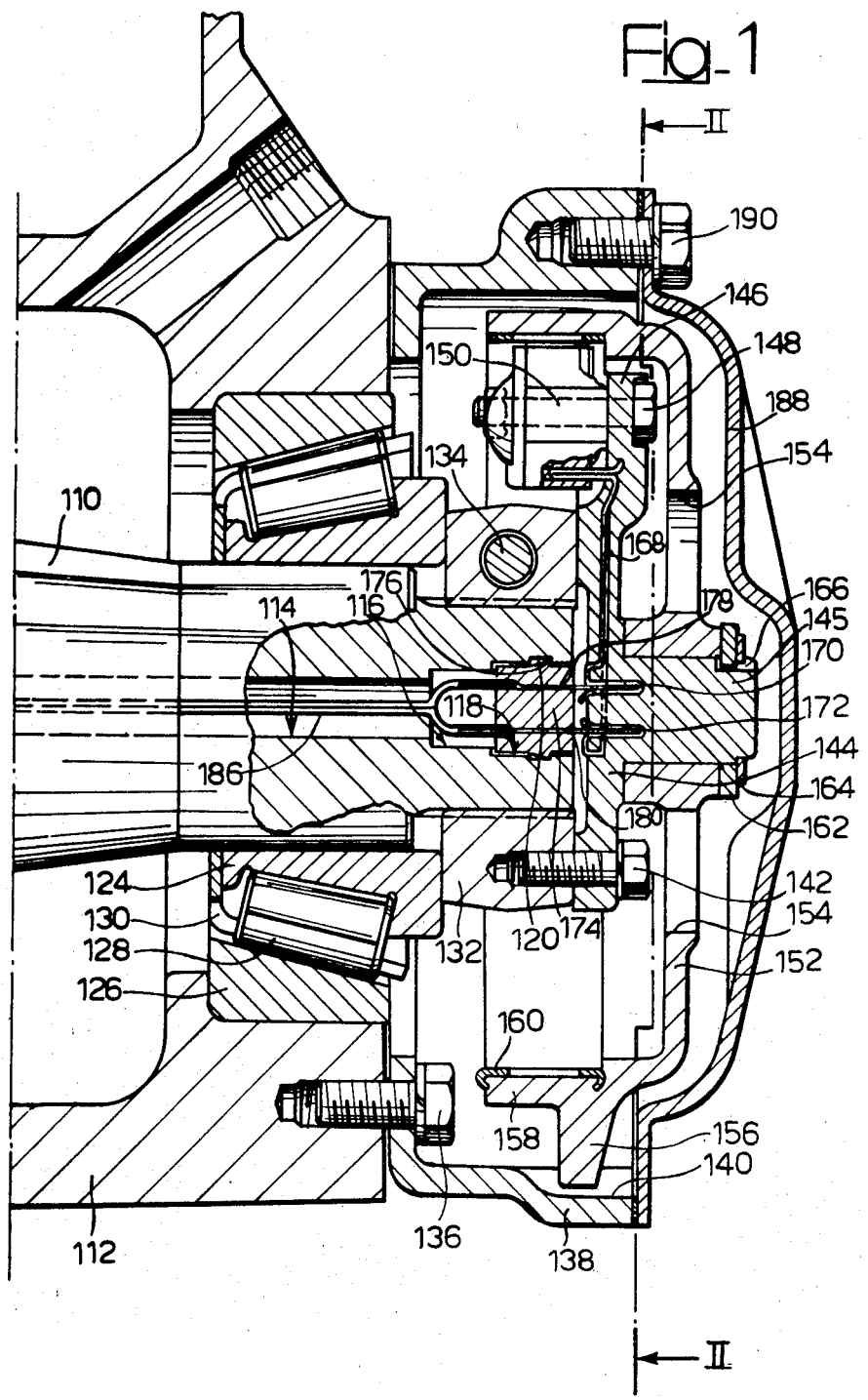
FIG. 1 is an axial sectional view of part of a stub axle and of the hub of a steerable wheel of a vehicle, fitted with a speed detector by means of a mounting system according to a first embodiment of the invention.
Figure 2:
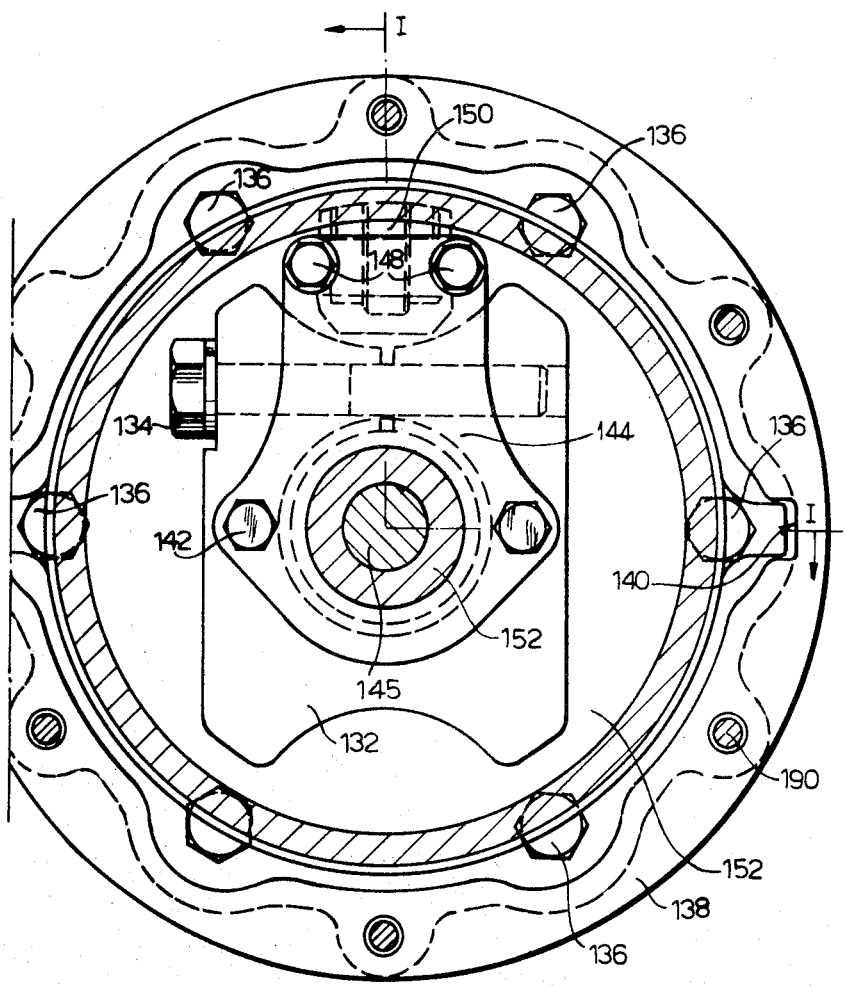
FIG. 2 is a cross sectional view taken along line II—II of FIG. 1.

Referring to FIGS. 1 and 2, a stub axle 110 of a front steerable wheel of a motor vehicle bears, through a conical roller bearing, a wheel hub 112. FIG. 1 shows a single bearing comprising an inner ring 124, an outer ring 126 and conical rollers 128 retained in a cage 130. The inner ring 124 of the bearing is retained on the stub axle 110 by a split sleeve 132 which is calmped on the end of the axle 110 by a bolt 134. The wheel hub may alternatively be supported by a double conical roller bearing.

A substantially cylindrical casing 138, coaxial with the stub axle 110, is affixed to the hub 112 by bolts 136. The casing 138 has two diametrically opposite longitudinally extending grooves 140 on its internal surface.

The stub axle 110 has an axial bore 114 which widens at its outer end into two successive counterbores 116, 118. The internal surface of the outermost and larger counter-bore 118 is formed with a circumferential groove 120.

On to the split sleeve 132 there is bolted, by means of bolts 142, a mounting 144, which may be of synthetic material, having a lug 146 to which a magnetic pick-up 150 is affixed by bolts 148. The pick-up 150 may be of any suitable known type. The mounting 144 has a cylindrical axially extending boss 145 upon which a toothed wheel, or so-called "phonic wheel" 152, is rotatably mounted. The wheel 152 is roughly bell-shaped, having adjacent the boss 145 holes 154 giving access to the fixing bolts 142 for the mounting 144. The wheel 152 has two radial appendages 156 on its outer cylindrical wall 158, which are located with play in the longitudinal grooves 140 in the casing 138.

The phonic wheel 152 is of synthetic material of the self-lubricating type, enabling it to rotate without appreciable wear on the boss 145.

The cylindrical wall 158 of the bell-shaped phonic wheel 152 has on its inside surface a ring of magnetic inserts 160 forming teeth which cooperate with the magnetic pick-up 150. The pick-up 150 generates a train of electrical pulses upon rotation of the phonic wheel 152, the latter rotating with the hub 112 of the wheel by virtue of its engagement with the casing 138. The phonic wheel 152 is kept in position on the boss 145 of the mounting 144 by a split expanding ring 164 which engages in a groove 166 in the cylindrical boss 145, a washer 162 being interposed between the wheel 152 and the ring 164.

From the pick-up 150 there leads a small two-wire cable 168 fixed to or buried in the mounting 144 and terminating near the axis of the mounting 144 in two spring sockets 170, 172 which face towards the counterbore 118 in the stub axle 110.

A small block 174 of synthetic insulating material is set into the counterbore 118 and has resilient teeth 176 which snap-engage into the circumferential groove 120 of the counterbore 118. Two pins 178, 180 extend through the insulating block 174 and fit into the sockets 170, 172 respectively when the mounting 144 is fixed to the sleeve 132. The pins 178, 180 extend into and terminate in the counterbore 116, in which the inner ends of the pins 178, 180 are connected by soldering to two respective ends of a small twin-core cable 186 extending through the axial bore 114 of the stub axle 110 and leading to devices, not illustrated, which process the output signal of the pick-up 150.

A cover 188 for the protection of the pick-up 150 and the phonic wheel 152 is fixed with bolts 198 to the casing 138.

For assembly of the detector device upon the stub axle, the cable 186 is threaded through the axial bore 114 of the axle 110 so that one end of the cable 186 projects from the outer end of the axle 110. The two cores of the cable 186 are then connected by soldering to the pins 178, 180 in the insulating block 174, which is then inserted into the counterbore 118. The mounting 144 carrying the pick-up 150 is then presented to the sleeve 132 and the phonic wheel 152 fitted over the boss 145 to abut the mounting 144, engaging the two pins 178, 180 in their respective sockets 170, 172. The mounting 144 is fixed to the sleeve 132 by means of the bolts 142, which are located and screwed up through the holes 154 in the phonic wheel 152. Finally the protective cover 188 is fitted and secured to the casing 138 by means of the bolts 190.

For maintenance and inspection or replacement of the detector device, it suffices simply to remove the cover 188, unscrewing the bolts 190 to give immediate access to the detector device. Slackening and removal of the bolts 142 permits complete disassembly and demounting of the detector assembly if desired.

A second embodiment of the invention will now be described, with reference to FIG. 3.

Figure 3:
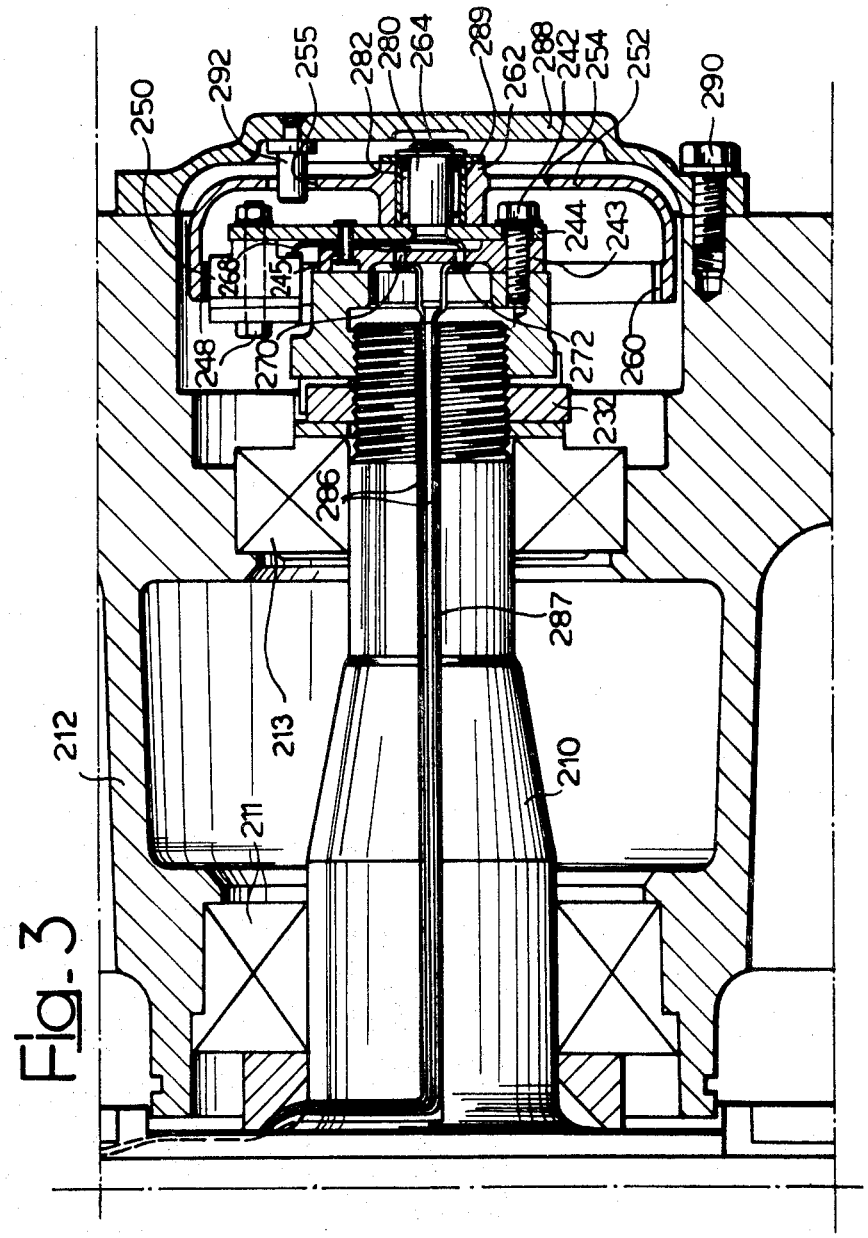
FIG. 3 is an axial sectional view, similar to FIG. 1, of a speed detector having a mounting system according to a second embodiment of the invention.

In FIG. 3 a front stub axle 210 of a motor vehicle rotatably supports, by means of a pair of conical roller bearings 211, 213, a hub 212 of a front wheel of the vehicle. The bearing 213 is retained by a nut 232 screwed on to the outer end of the stub axle 210. A mounting plate consisting of two parts 243, 244 fixed together by rivets 245 (one only of which is shown) is fixed to the outer end of the nut 232 by means of bolts 242, one only of which is shown.

An electromagnetic pick-up 250, of known type, is secured to the plate 244 by a bolt 248. A twin-cored cable 268 is connected to and leads from the pick-up 250, passes through a gap between the two plates 243, 244 and is connected through two pin and socket connectors 270, 272 to another twin-cored cable 286 which leads to signal processing circuits (not shown) mounted in the vehicle, the cable 286 passing through a longitudinal groove 287 made in the surface of the stub axle 210.

To the outer face of the plate 244 there is affixed a pin 280, coaxial with the axle 210, upon which a cup-shaped phonic wheel 252 is rotatably mounted. The wheel 252 has a row of ferromagnetic teeth 260 on the inside of its substantially cylindrical wall. The wheel 252 is rotatably supported on the pin 280 by means of a needle roller bearing 282, held in position in a bush 289. The phonic wheel 252 is retained in position on the pin 280 by a spring clip 264 with a washer 262 interposed between the clip 264 and the wheel 252.

A hole 254 in the phonic wheel 252 allows access to the bolts 252 which secure the mounting plate 243, 244 to the bearing-retaining nut 232.

When the speed detector device comprising the mounting plate 243, 244, pick-up 250 and phonic wheel 252 is in position, the entire assembly is protected by an external cover 288 fixed to the hub 212 by bolts 290, one only of which is shown, and fitted with an inwardly projecting pin 292 which engages, with some play, in a hole 255 in the phonic wheel 252 to cause the latter to rotate with the wheel hub 212, without nevertheless anchoring the phonic wheel rigidly to the hub, and hence without interfering with the centering of the phonic wheel 252 relative to the pick-up 250.

The roller bearing 282 makes it possible to provide a satisfactory and durable support for the phonic wheel at relatively low cost.

The embodiments herein described are illustrated assembled on a front wheel of a vehicle, fitted with a stub axle. It will, however, be appreciated that the same structure can be mounted, with slight variations, on a rear wheel of a vehicle.

We claim:

1. Mounting system for an angular speed detector for a vehicle wheel mounted on a stub axle, particularly for anti-skid braking systems, comprising:

a mounting fixed to the outer end of the stub axle;

a magnetic pick-up fixed to the mounting;

a phonic wheel rotatable relative to the mounting;

magnetic teeth carried by said phonic wheel and cooperating with said pick-up, drive means for driving the phonic wheel in rotation with the vehicle wheel, and a cylindrical appendage on said mounting provided with a low-friction bearing rotatably supporting said phonic wheel, said stub axle having a longitudinal channel and said pick-up being connected to a cable carried by the mounting and connected to terminals adapted to engage respective ends of a cable lodged in said longitudinal channel in the stub axle.

2. Mounting system as claimed in claim 1, wherein said stub axle has a recess in one end and wherein the connection between said cable and the terminals on the mounting is constituted by a block carrying connecting pins, said block being located in said recess and having resilient teeth which secure the block in the recess.

3. Mounting system for an angular speed detector for a vehicle wheel mounted on a stub axle, particularly for anti-skid braking systems, comprising:

a mounting fixed to the outer end of the stub axle;

a magnetic pick-up fixed to the mounting;

a phonic wheel rotatable relative to the mounting;

magnetic teeth carried by said phonic wheel and cooperating with said pick-up, drive means for driving the phonic wheel in rotation with the vehicle wheel, and a cylindrical appendage on said mounting provided with a low-friction bearing rotatably supporting said phonic wheel, said cylindrical appendage of said mounting comprises a pin on which the phonic wheel is rotatably supported, said bearing comprising a roller bearing.

4. Mounting system as claimed in claim 3, wherein said phonic wheel drive means comprise a pin carried by a part attached to the vehicle wheel, said pin engaging with play in a hole in said phonic wheel.

* * * * *